June 4, 1968   E. M. TRAMMELL, JR   3,386,429
INTERNAL COMBUSTION ENGINE
Filed July 11, 1966   3 Sheets-Sheet 1
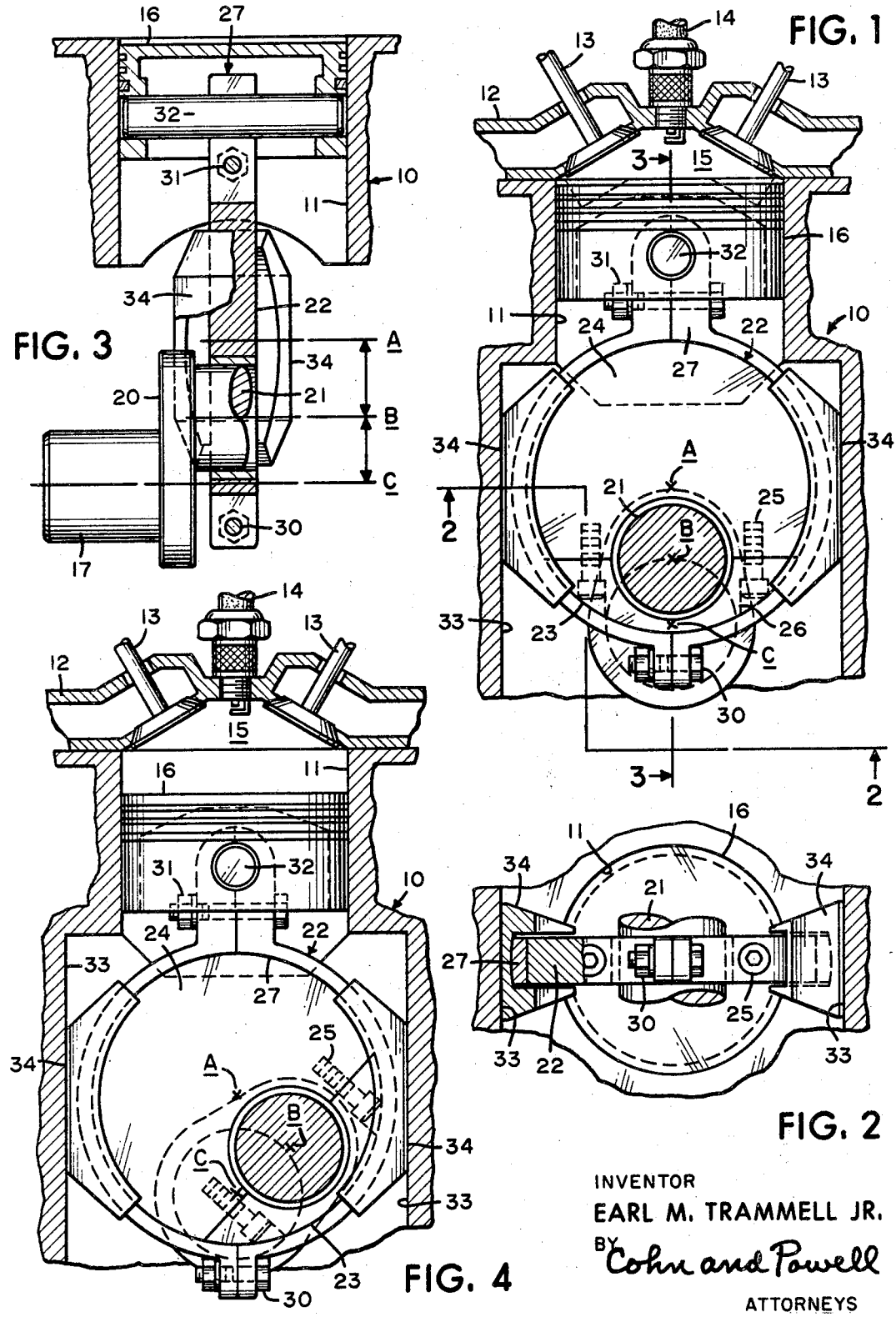
INVENTOR
EARL M. TRAMMELL JR.
BY *Cohn and Powell*
ATTORNEYS June 4, 1968  E. M. TRAMMELL, JR  3,386,429
INTERNAL COMBUSTION ENGINE
Filed July 11, 1966  3 Sheets-Sheet 2

INVENTOR
EARL M. TRAMMELL JR.
BY Cohn and Powell
ATTORNEYS

INVENTOR
EARL M. TRAMMELL JR.
BY Cohn and Powell
ATTORNEYS

United States Patent Office 3,386,429
Patented June 4, 1968

3,386,429
INTERNAL COMBUSTION ENGINE
Earl M. Trammell, Jr., Ladue, Mo.
(Box 435, St. Louis, Mo. 63166)
Filed July 11, 1966, Ser. No. 564,195
8 Claims. (Cl. 123—197)

ABSTRACT OF THE DISCLOSURE

A crankshaft assembly in an internal combustion engine that permits a substantial reduction in conventional connecting rod lengths for piston-operating engines. The assembly has a connector bearing oscillatively mounted to a crankarm bearing so that the center axes of the connector bearing and crankarm bearing are eccentric, and so that the distance between the center axes of the connector bearing and crankarm bearing determines the length of a comparable effective, conventional, connecting rod. To provide this advantageous result, the distance between the center axes of the connector bearing and crankarm bearing is greater than the distance between the center axes of the crankarm bearing and the crankshaft. Furthermore, the center axis of the connector bearing is located between the center axis of the crankarm bearing and the top of the piston at all times during rotation of the crankshaft.

---

This invention relates generally to improvements in an internal combustion engine, and more particularly to an improved crankshaft design that permits substantial reduction in conventional connecting rod lengths for piston-operating engines.

There are two distinct and important advantages attained by the present improved crankshaft mechanism that effects a short connecting rod, namely: (1) the torque is increased, and (2) the piston speed is increased during maximum pressures of the power stroke.

It is obviously advantageous to boost the engine torque without increasing the bore area or the length of stroke. Equally advantageous, especially for high compression engines, is to have the piston travel or speed at its maximum during maximum pressures of the power stroke because there is a more efficient transmittal of thermal energy into mechanical energy or power. Very important, also, is that this condition permits the use of higher compression ratios.

To be specific, in present automotive engines with average six-inch connecting rods and with three to four-inch strokes, maximum pressures occur at approximately 20° past DTC of the power stroke. Maximum accelerated piston travel occurs, and 100% of piston thrust is transmitted into torque at approximately 73° past DTC, while in the subject crankshaft mechanism such conditions occur at approximately 49° past DTC Therefore, it will be understood that the subject crankshaft mechanism will more efficiently utilize the greater piston pressures in high compression engines. Also, from these facts, it can be shown, strokes being equal, that the new crankshaft mechanism will provide from 50% to 60% faster piston speed from and from 50% to 60% more torque from 1° to 49° of the power stroke than that of the present engines.

An important objective is achieved by the provision of an internal combustion engine having a cylinder in which a piston is reciprocatively mounted, and by the provision of a connector bearing oscillatively mounted to a crankarm, the center axes of the connector bearing and the crankarm bearing being eccentric. The distance between the center axes of the connector bearing and the crankarm bearing determines the length of a comparable effective connecting rod.

A further important objective is achieved by the provision of means operatively mounting the connector bearing for oscillative movement, operatively connecting the connector bearing to the piston, and constraining the connector bearing to a predetermined path on reciprocation of the piston. Specifically, in one embodiment, the last said means includes a track internally of the piston on which the connector bearing is slidably mounted and rides during oscillative movement, the interengagement of the connector bearing and track constraining the connector bearing to a path primarily in the direction of piston travel.

Another important objective is afforded by the structural arrangement of a guide means that is operatively associated with a connector housing in which the connector bearing is oscillatively mounted for constraining the connector housing and connector bearing to a predetermined path upon reciprocation of the piston operatively connected to the connector housing. More particularly, the guide means constrains the connector housing and connector bearing to a path primarily in the direction of piston travel.

Still another important objective is attained by constructing the connector bearing of two members joined in a plane through the axis of the crankarm bearing to facilitate assembly, the members being detachably fastened together.

An important objective is realized in that the guide means absorbs the side thrust from the connector bearing and the connector housing. With this structure, the cylinder and piston can be constructed of compatible oblong cross-sectional shapes, the longitudinal axes of which are aligned substantially transverse to the crankshaft.

Another important object is provided by the structural arrangement in which the center axis of a circular connector bearing is aligned in a plane with the center axis of the crankshaft and parallel to the direction of piston travel, and in which the guide means constrains the connector housing and connector bearing to a substantially straight path in the said plane.

Yet another important objective is achieved by constructing the guide means, in one embodiment, to include opposed bearing surfaces below the cylinder, and slide shoes carried by opposite sides of the connector housing which engage the opposed bearing surfaces to constrain the connector housing and connector bearing to a substantially straight path in the direction of piston travel.

An important objective is afforded by making the distance between the center axes of the connector bearing and the crankarm bearing greater than the radius of the crankarm, whereby to provide a mechanism having a short, comparable, effective connecting rod.

Another important objective is achieved by constructing the guide means, in another embodiment, to include a pivot connection to the connector housing at one side of the crankshaft, the pivot connection constraining the connector housing and connector bearing to a substantially straight path in the direction of piston travel even though such path may assume a slight arc.

It is an important objective to provide an internal combustion engine incorporating a crankshaft mechanism that is simple and durable in construction, economical to manufacture and assemble, and highly efficient in operation.

The foregoing and numerous other objects and advantages of the invention will more clearly appear from the following detailed description of several preferred embodiments, particularly when considered in connection with the accompanying drawings, in which:

FIG. 1 is a vertical section through an internal combustion engine taken through one of the cylinders and having incorporated therein an embodiment of the invention, the piston being illustrated at DTC (dead top center);

FIG. 2 is a fragmentary, cross-sectional view taken on staggered line 2—2 of FIG. 1;

FIG. 3 is a fragmentary, cross-sectional view taken on line 3—3 of FIG. 1;

FIG. 4 is a vertical section similar to FIG. 1, but illustrating the crankarm at approximately 49° past DTC;

Figure 7:
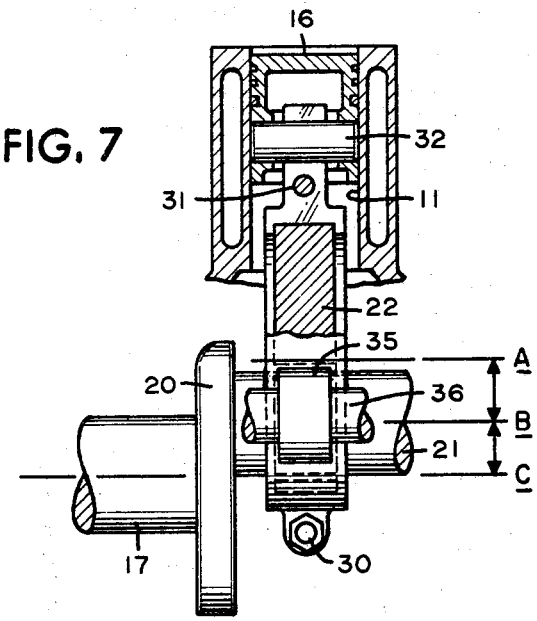
FIG. 7 is a fragmentary, cross-sectional view taken on staggered line 7—7 of FIG. 6.

Referring now by characters of reference to the drawings, and first to the embodiment of FIGS. 1–4, it will be understood that the internal combustion engine includes a block generally indicated by 10 having a cylinder 11 of substantially circular cross-section. The top of the cylinder 11 is closed by a head 12 carrying the valves 13 and sparkplug 14. The head 12 is shaped to form the combustion chamber 15. Reciprocatively mounted within the cylinder 11 is a compatible piston 16. As is best shown in FIG. 2, the piston 16 has a substantially circular configuration that closely matches the circular shape of cylinder 11.

Because of the crankshaft mechanism incorporated in this engine, there is no side thrust between the piston 16 and the walls defining cylinder 11. Therefore, a piston 16 and cylinder 11 of oblong configuration could be advantageously utilized to minimize the length of the engine. In addition, the height of the piston 16 can be substantially reduced so as to reduce weight and the over-all height of the engine.

Extending longitudinally in the engine block 10 is a rotatively mounted crankshaft 17, the center axis of which is designated by the reference character C. The crankshaft 17 provides a crankarm 20 and a crankarm bearing 21. The center axis of the crankarm bearing 21 is designated by reference character B.

Oscillatively mounted on the crankarm bearing 21 is a circular connector bearing 22. The center axis of the connector bearing 22 is designated by the reference character A. The center axis A of the connector bearing and the center axis B of the crankarm bearing are eccentric. The distance between the center axis A of the connector bearing 22 and the center axis B of the crankarm bearing 21 represents the length of a comparable connecting rod in the heretofore conventional crankshaft mechanism. The distance between the center axis B of the crankarm bearing 21 and the center axis C of the crankshaft 17 represents the crankarm radius. For reasons which will later appear, it is important that the distance between the center axes A and B is greater than the distance between the center axes B and C.

The connector bearing 22 is split into two members 23 and 24 joined together in a plane through the center axis B of the crankarm bearing 21 to facilitate assembly. A plurality of cap screws 25, one on each side of the crankarm bearing 21, interconnect the two bearing members 23 and 24. The heads of the cap screws 25 are shielded within peripheral recesses 26 formed in the bearing member 23.

A circular connector housing referred to by 27 oscillatively mounts the connector bearing 22. The connector housing 27 slidably embraces the periphery of the connector bearing 22. It will be importantly noted that the connector bearing 22 freely oscillates within the connector housing 27. For ease of assembly, the connector housing 27 is split into two identical parts in a vertical plane passed through the center axis C of crankshaft 17. The connector housing parts are secured together by bolt and nut connections 30 and 31. One such connection 30 is located below, while the other connection 31 is located above the connector bearing 22.

The connector housing 27 is operatively connected to the piston 16 by a wrist pin 32 so that the connector housing 27 and piston 16 will reciprocate as a unit.

A guide means is operatively associated with the connector housing 27 to constrain the connector housing 27 and connector bearing 22 to a predetermined path upon reciprocation of the piston. This guide means includes a pair of opposed bearing surfaces 33 formed below the cylinder 11 on opposite sides of the crankshaft 17. A pair of slide shoes 34 are carried by opposite sides of the connector housing 27, the slide shoes 34 engaging the bearing surfaces 33 to constrain the connector housing 27 and connector bearing 22 to a substantially straight path in the direction of piston travel.

These slide shoes 34 and the associated bearing surfaces 33 cooperate to absorb the side thrust from the connector bearing 22 and the connector housing 27. Consequently, the piston 16 and cylinder 11 can have a circular or an oblong shape and the piston 16 can have a shortened height, as explained previously. When an oblong shape is used, the longitudinal axis of the oblong piston 16 and cylinder 11 extends transversely to the center axis C of the crankshaft 17.

It is thought that the functional advantages have become fully apparent from the foregoing detailed description of parts, but for completeness of disclosure, a brief description of the operation will be given. The component parts of the crankshaft mechanism assume the positions illustrated in FIG. 1 when the piston 16 is located at DTC. As the piston 16 moves downwardly in the cylinder 11, the shoes 34 engaging the bearing surfaces 33 constrain the connector housing 27 and the connector bearing 22 to a straight vertical path. Consequently, as the crankarm bearing 21 rotates in a clockwise direction, as for example, from the DTC position of FIG. 1 to the 49° past DTC shown in FIG. 4, the connector bearing 22 will turn slightly about the crankarm bearing 21 and will slide freely in a counterclockwise direction within the connector housing 27. Upon continued downward movement of the piston 16, the crankshaft 17 will rotate and the crankarm bearing 21 will move to 180° past DTC, at which point the connector bearing 22 will have turned in a clockwise direction within the connector housing 27 back to the initial position shown in FIG. 1. As the piston 16 moves upwardly within the cylinder 11, the crankshaft 17 will continue to move in a clockwise direction, thereby causing the connector bearing 22 to turn in the opposite direction about the crankarm bearing 21 and in a clockwise direction within the connector housing 27. Upon continued rotation of the crankshaft 17, as the crankarm bearing 21 approaches the DTC position shown in FIG. 1, the connector bearing 22 will turn in a counterclockwise direction within the connector housing 27 back to its initial position shown in FIG. 1. It will be understood that the connector bearing 22 will oscillate between limits on the crankarm bearing 21 and within the connector housing 27 during each cycle of crankshaft rotation.

The maximum piston speed occurs at approximately 49° before and after DTC, 100% of the piston thrust is transmitted into torque at 49° past DTC. In the present heretofore conventional engines, maximum accelerated piston travel and 100% of piston thrust is transmitted into torque at approximately 73° past DTC. It can be shown, strokes being equal, that the subject crankshaft mechanism will provide from 50% to 60% faster piston speed and from 50% to 60% more torque from 1° to 49° of the power stroke than that of the present engines.

Figure 5:
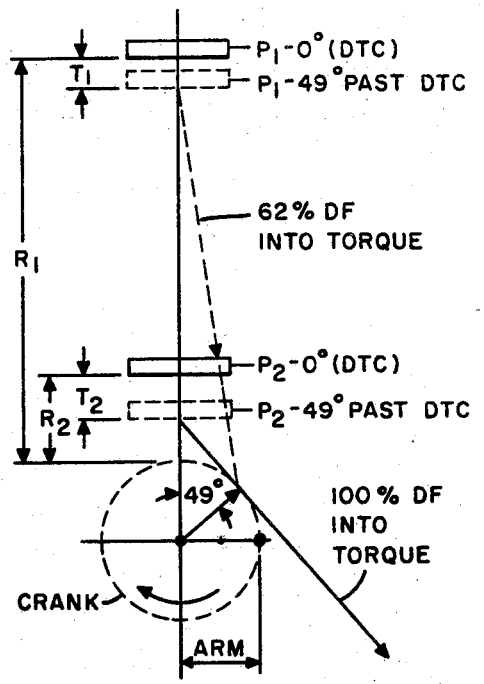
FIG. 5 is a diagrammatic illustration comparing the results of the subject crankshaft mechanism with that achieved by the conventional connecting rod type.

These advantageous results are clearly shown by the comparison diagram illustrated in FIG. 5. This diagram shows a 2¼-inch stroke piston engine having a 6-inch connecting rod R–1 and a 1¼-inch connecting rod R–2. By comparison, the effect these two different length rods R–1 and R–2 have on torque and piston travel can be seen and measured. It will be noted that at 49° past DTC, the connecting rod R–1 is transmitting approximately 62% of the piston force into torque, while the connecting rod R–2 is transmitting 100% of the piston force into torque. This amounts to connecting rod R–2 providing 60% more torque than connecting rod R–1 from 0° to 49° of the power stroke.

With the dimensions given above, and checking the amount of piston travel from zero degrees to 49° past DTC, it will be noted that piston P–1 travels 0.415 inch designated by T–1, while piston P–2 travels 0.688 inch designated by T–2. By calculation, piston P–2 travels 0.273 inch more than piston P–1, which amounts to 60% faster piston speed for piston P–2 over piston P–1.

Again, it is pointed out, from 1° to 49° past DTC, which in high compression engines is sufficient range for expending effective pressures, that the shorter rod action made possible through the subject crankshaft mechanism, will provide 60% more torque and 60% more piston speed than that of present engines with conventionally longer rods.

It is recognized that there is increased bulk in the subject crankshaft mechanism, but the component parts can be constructed of lightweight alloys because of these parts are designed so that there is little stress exerted on them.

Figure 6:
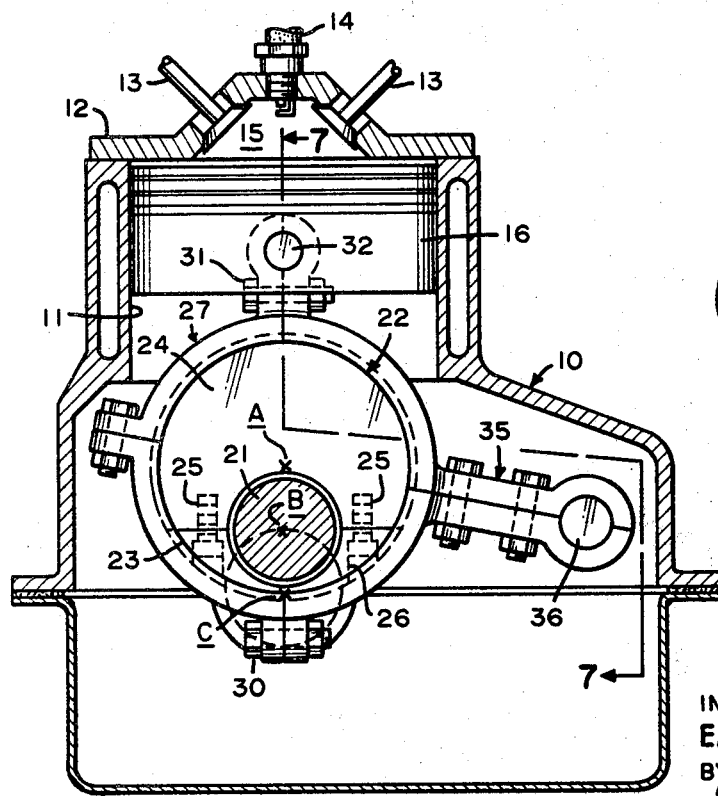
FIG. 6 is a vertical section taken through one of the cylinders and incorporating a modified guide means for the crankshaft mechanism.
Figure 8:
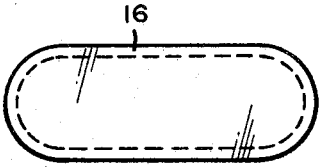
FIG. 8 is a top plan view of the oval piston used in the embodiment of FIG. 6.
Figure 9:
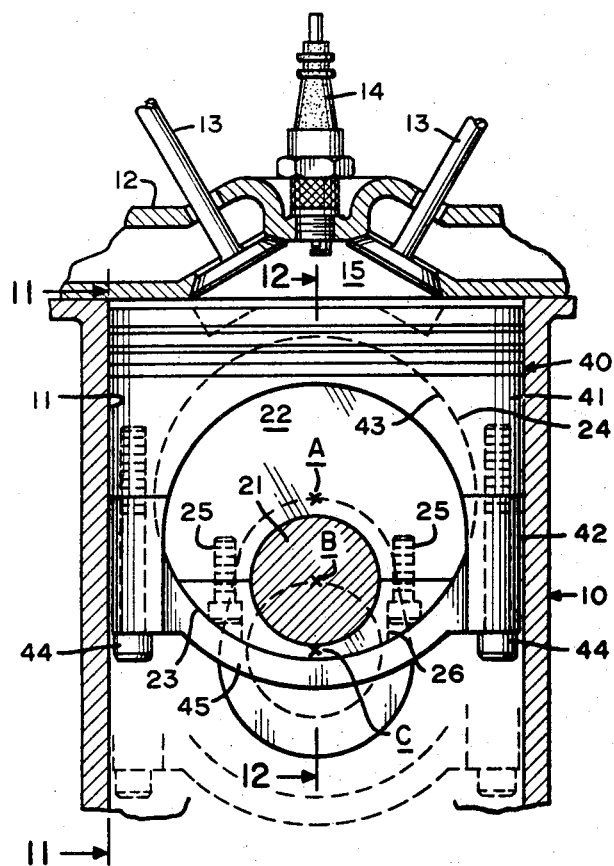
FIG. 9 is a vertical section taken through one of the cylinders and incorporating still another modified crankshaft mechanism.
Figure 11:
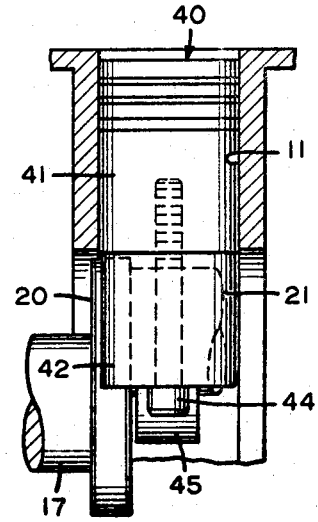
FIG. 11 is a fragmentary, cross-sectional view taken on line 11—11 of FIG. 9.
Figure 12:
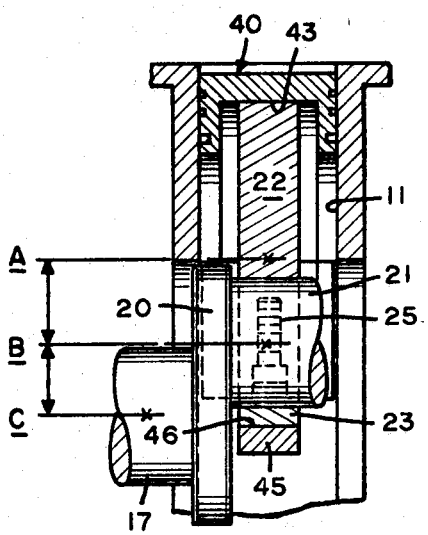
FIG. 12 is a fragmentary, cross-sectional view taken on staggered line 12—12 of FIG. 9.
Figure 10:
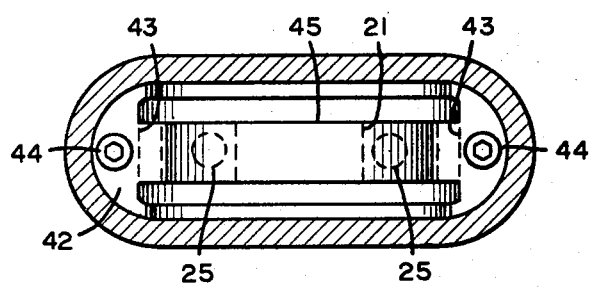
FIG. 10 is a bottom plan view of a mechanism illustrated in FIG. 9.

FIGS. 6, 7 and 8 illustrate a different embodiment of the invention. Most of the component parts of this embodiment are identical in construction to the embodiment of FIGS. 1–4, and, accordingly, the corresponding parts will be given identical reference numerals wherever possible. The essential differences reside in the construction of the guide means adapted to constrain the connector housing 27 and the connector bearing 22 to a substantially straight path primarily in the direction of piston travel. Otherwise, the mode of operation and the functional advantages and results are identical with those realized by the embodiment of FIGS. 1 through 4, described in detail previously.

This guide means (FIGS. 6 and 7) includes a housing connector arm 35 pivotally mounted on pin 36 at one side of the crankshaft 17. As a result, the connector housing 27 and the connector bearing 22 will move in a slight arc in the direction of piston travel during reciprocation of the piston as determined by the pivotal mounting of the connector housing 27 on the pin 36. As mentioned, the arc of movement is slight so that it can still be stated that the movement of the connector housing 27 and connector bearing 22 is essentially and primarily in a substantially straight path in the direction of piston travel. Moreover, this pivot connection of the connector housing 27 absorbs the side thrust from the connector housing 27 and the connector bearing 22 so that the advantageous oblong piston 16 and cylinder 11 configuration can be utilized if desired.

Perhaps some of the advantages of the present crankshaft mechanism can be better understood if it is realized that in an engine utilizing a 3½-inch stroke, for example, the heretofore conventional engine structure requires a minimum rod length of approximately 6 to 7 inches. Certainly, the conventional rod length cannot be less than the stroke of 3½ inches. With the present invention, the effective comparable rod length can be must less than the stroke, as for example, only slightly greater than 1¾ inches.

FIGS. 9 through 12 disclose a different embodiment of the invention. Some of the component parts of this embodiment are identical in construction to the embodiment of FIGS. 1–4, and accordingly, the corresponding parts will be given identical reference numerals whenever possible. The essential differences reside in the construction of the piston and its connection to the connector bearing.

In this embodiment the piston 40 is of oblong shape and is constructed of separable, yet attached piston members 41 and 42. It will be understood that the piston 40 can be of circular cross-section, but is illustrated as an oblong to emphasize the compact structure realized by the subject crankshaft mechanism.

The upper piston member 41 is open at the bottom and is provided with an internal, substantially semi-circular track 43 on which the circular connector bearing 22 slidably seats. The skirt of the piston 40 depends along and about the connector bearing 22.

The lower piston member 42 is attached to the upper piston member 41 by a pair of cap screws 44. This lower piston member 42 includes a transverse strip 45 that provides an internal, substantially semi-circular track 46 that complements the arcuate track 43 formed in the upper piston member 41, the arcuate track 46 slidably engaging the periphery of the connector bearing 22.

The tracks 43 and 46 correspond in essence to the connector housing 27 in the embodiments of FIGS. 1 and 6 in that the tracks 43 and 46 constitute means operatively mounting the connector bearing 22 for oscillative movement, operatively connecting the connector bearing 22 to the piston 40, and constraining the connector bearing 22 to a predetermined path upon reciprocation of the piston 40.

As the piston 40 moves downwardly in the cylinder 11, the slidable engagement of the connector bearing 22 with the arcuate tracks 43 and 46 constrain the connector bearing 22 to a straight vertical path. Consequently, as the crankarm bearing 21 rotates in a clockwise direction, the connector bearing 22 will turn slightly about the crankarm bearing 21 and will slide freely in a counterclockwise direction on the tracks 43 and 46 internally of piston 40. Upon continued downward movement of the piston 40, the crankshaft 17 will rotate and the crankarm bearing 21 will move to 180° past DTC, at which point the connector bearing 22 will have turned in a clockwise direction within the tracks 43 and 46 back to the initial position shown in FIG. 1. As the piston 40 moves upwardly within the cylinder 11, the crankshaft 17 will continue to move in a clockwise direction, thereby causing the connector bearing 22 to turn in the opposite direction about the crankarm bearing 21 and in a clockwise direction on the tracks 43 and 46 internally of the piston 40. Upon continued rotation of the crankshaft 17, as the crankarm bearing 21 approaches the DTC position shown in FIG. 1, the connector bearing 22 will turn in a counterclockwise direction on the tracks 43 and 46 back to its initial position shown in FIG. 1. It will be understood that the connector bearing 22 will oscillate between limits on the crankarm bearing 21 and within the piston 40 on the tracks 43 and 46 during each cycle of the crankshaft rotation.

Otherwise, the mode of operation and the functional results and advantages are identical with the embodiment previously described in detail with respect to FIGS. 1 through 4.

Although the invention has been described by making detailed reference to several embodiments, such detail is to be understood in an instructive, rather than in any restrictive sense, many variants being possible within the scope of the claims hereunto appended.

I claim as my invention:

1. In an internal combustion engine:

(a) a cylinder, (b) a piston reciprocatively mounted in the cylinder,
(c) a crankshaft including a crankarm having a crankarm bearing,
(d) a connector bearing oscillatory mounted to the crankarm,
(e) the center axes of the connector bearing and the crankarm bearing are eccentric, the distance between the center axes of the connector bearing and the crankarm bearing determining the length of a comparable effective connecting rod,
(f) the distance between the center axis of the connector bearing and the center axis of the crankarm bearing being greater than the distance between the center axis of the crankarm and the center axis of the crankshaft,
(g) the center axis of the connector bearing being located between the center axis of the crankarm bearing and the top of the piston at all times during rotation of the crankshaft, and
(h) means operatively mounting the connector bearing for oscillative movement, operatively connecting the connector bearing to the piston, and constraining the connector bearing to a predetermined path upon reciprocation of the piston.

2. An internal combustion engine as defined in claim 1, in which:
(i) the last said means includes a track internally of the piston on which the connector is slidably mounted and rides during oscillative movement, the interengagement of the connector bearing and track constraining the connector bearing to a path primarily in the direction of piston travel.

3. An internal combustion engine as defined in claim 1, in which:
(i) the last said means includes an arcurate track internally of the piston on which the connector bearing is slidably mounted and rides during oscillative movement,
(j) the connector bearing is circular and has its center axis aligned in a plane with the center axis of the crankshaft and parallel to the direction of piston travel, and
(k) the interengagement of the connector bearing and the arcuate track constrains the connector bearing to a substantially straight path in the said plane.

4. An internal combustion engine as defined in claim 3, in which:
(l) the piston receives internally and seats on the connector bearing, the piston including a skirt portion that depends along and about the connector bearing.

5. In an internal combustion engine:
(a) a cylinder,
(b) a piston reciprocatively mounted in the cylinder,
(c) a crankshaft including a crankarm having a crankarm bearing,
(d) a connector bearing oscillatively mounted to the crankarm,
(e) the center axes of the connector bearing and the crankarm bearing are eccentric, the distance between the center axis of the connector bearing and the crankarm bearing determining the length of a comparable effective connecting rod,
(f) the distance between the center axis of the connector bearing and the center axis of the crankarm bearing being greater than the distance between the center axis of the crankarm bearing and the center axis of the crankshaft,
(g) the center axis of the connector bearing being located between the center axis of the crankarm bearing and the top of the piston at all times during rotation of the crankshaft,
(h) a connector housing carried by and movable with the piston, the connector bearing being oscillatively mounted in the connector housing, and
(i) guide means operatively associated with the connector housing for constraining the connector housing and connector bearing to a predetermined path upon reciprocation of the piston.

6. An internal combustion engine as defined in claim 5, in which:
(j) the guide means includes opposed bearing surfaces below the cylinder, and
(k) separate slide shoes are carried by opposite sides of the connector housing and engage the bearing surfaces to constrain the connector housing and connector bearing to a substantially straight path in the direction of piston travel.

7. An internal combustion engine as defined in claim 5, in which:
(j) the guide means includes a pivot connection to the connector housing at one side of the crankshaft, the pivot connection constraining the connector housing and connector bearing to a substantially straight path in the direction of piston travel.

8. An internal combustion engine as defined in claim 5, in which:
(j) the guide means includes a pivot connection to the connector housing at one side of the crankshaft, the pivot connection constraining the connector housing and connector bearing to only a slight arcuate path in the direction of piston travel.

References Cited

UNITED STATES PATENTS

| | | | |
|---|---|---|---|
| 684,745 | 10/1901 | Carey | 123—197 |
| 947,233 | 1/1910 | Hammond | 74—49 |
| 1,526,309 | 2/1925 | Hof | 123—193 |
| 1,867,981 | 7/1932 | Mudd | 74—50 |

FOREIGN PATENTS

| | | |
|---|---|---|
| 637,715 | 5/1928 | France. |
| 677,196 | 12/1929 | France. |
| 725,239 | 9/1942 | Germany. |
| 497,847 | 5/1930 | Germany. |

WENDELL E. BURNS, *Primary Examiner.*